(No Model.)

N. A. GIBBS.
CHECK BOOK.

No. 281,682. Patented July 24, 1883.

Attest:
Courtney A. Cooper
William Paxton

N. A. Gibbs
Inventor:
By Charles E. Foster
Atty

UNITED STATES PATENT OFFICE.

NATHAN A. GIBBS, OF NORWICH, CONNECTICUT.

CHECK-BOOK.

SPECIFICATION forming part of Letters Patent No. 281,682, dated July 24, 1883.

Application filed November 7, 1882. (No model.)

*To all whom it may concern:*

Be it known that I, NATHAN A. GIBBS, a citizen of the United States, and a resident of Norwich, in the county of New London and State of Connecticut, have invented certain new and useful Improvements in Check-Books, of which the following is a specification.

My invention relates to that class of check or draft books in which stubless detachable checks are combined with record-leaves; and my invention consists of a construction and arrangement of parts, as hereinafter described, whereby the keeping of an exact record of each transaction and the ascertaining of the balance on hand is greatly facilitated, while the parts are in a compact and accessible condition.

Figure 1:
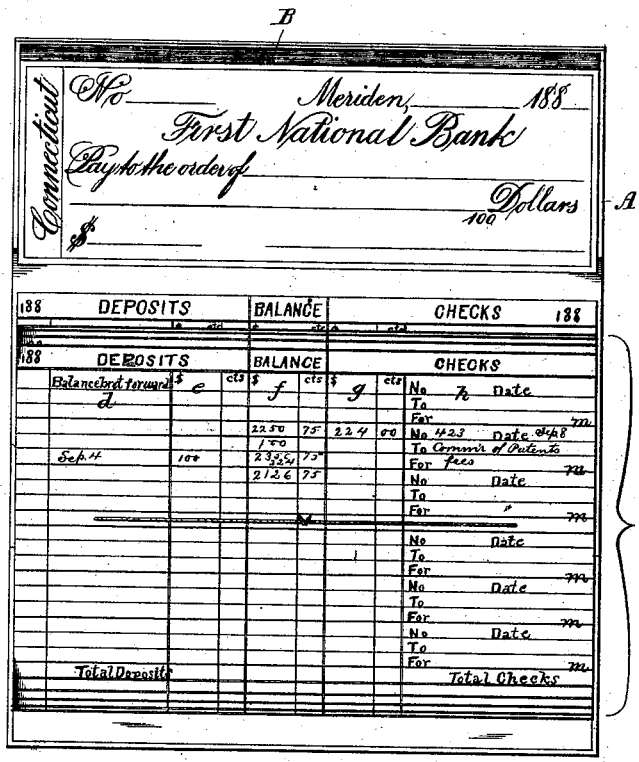
Figure 2:
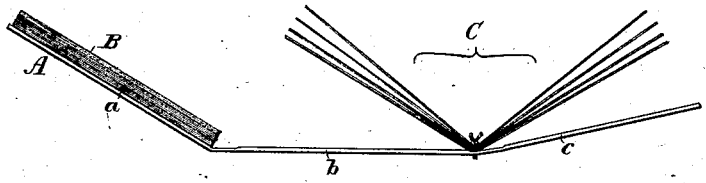

In the drawings, Figure 1 is a perspective view of the improved check-book open. Fig. 2 is an edge view.

The back A of the book, as shown, is formed to constitute three panels, $a\ b\ c$, capable of being folded like those of an ordinary pocket-book. To the inside of the panel $a$ is secured the mass of blank checks B, collected in the form of a tablet or otherwise, so as to be readily separately detachable. At the hinged junction of the panels $b$ and $c$ is secured the folded edge of a package of record-leaves, C, one of which may be pasted down upon the face of the panel $b$. Each leaf C is divided by vertical lines into five sections, $d\ e\ f\ g\ h$, and longitudinal lines $m$ define the length of these sections. The sections $d$ and $e$ are for the record of the date and amount of deposits, the section $f$ for a record of the balance, the section $g$ for the record of the amount of checks drawn, and the section $h$ for the memorandum of the number, date, and drawee of the check. This permits a ready and expeditious record and easy ascertaining of the balance and constant record thereof. Thus, the balance being at the head of the section $f$, a deposit is entered in the sections $d\ e$ and added to the balance in section $f$, and the new balance placed on the line below the old in section $f$, the amount of a check drawn is entered in the section $g$ and is deduced from the last balance in section $f$, and the new balance placed in the next lower section of the division $f$. After the last (the sixth) check on each double page is deducted the total of deposits less the total of checks will equal the last balance in division $f$, which is the new balance carried forward to next page.

By the hinging of the series of leaves C at the junction of the panels $b$ and $c$, such leaves may be turned down on the panel $c$ as a support, so that I can use both sides for and secure an extended record in a very compact condition.

I claim—

The combination, in a check record book, of a cover, A, folded to form three panels, $a\ b\ c$, a series of checks secured to the panel $a$, and a series of record-stubs secured at the inner edges at the junction of the panels $b$ and $c$, as set forth.

In testimony whereof I have signed my name to this specification in the presence of two subscribing witnesses.

NATHAN A. GIBBS.

Witnesses:
   C. W. LANMAN,
   ALFRED S. CHILDS.